United States Patent Office 2,702,248
Patented Feb. 15, 1955

2,702,248

SIRUP TREATMENT OF APPLES

Dante G. Guadagni, Albany, Calif., assignor to United States of America as represented by the Secretary of Agriculture No Drawing. Application September 29, 1950,
Serial No. 187,654

3 Claims. (Cl. 99—193)

(Granted under Title 35, U. S. Code (1952), sec. 266)

This application is made under the act of March 3, 1883, as amended by the act of April 30, 1928, and the invention herein described and claimed if patented in any country, may be manufactured and used by or for the Government of the United States of America throughout the world for governmental purposes without the payment to me of any royalty thereon.

This application is a continuation-in-part of my prior application for patent Serial No. 791,441, filed December 12, 1947, now abandoned.

This invention relates to the treatment of apples, particularly to the treatment of apples with sugar solutions to improve the texture thereof.

Preservation of apples by freezing is well known and widely used, but several problems are encountered. One of the foremost is the fact that many types of apples such as Delicious, McIntosh, Gravenstein, etc. form a product of poor texture. When the frozen apples are thawed, they are found to be soft and entirely unsuitable for use in making pies, cobblers, tarts, etc. In some cases, the thawed apples are firm in texture but become mushy when used in pies or other bakery products.

It has been found that if the apples are impregnated with sugar syrup previous to freezing a vastly superior product is obtained. To this end, apples, preferably in the form of slices, are subjected to a vacuum to remove a large proportion of the air present in the apple tissues; the vacuum is then broken while the apples are in contact with sugar syrup whereby they absorb the syrup. The slices are then drained to remove excess syrup and frozen in the customary manner. Alternatively, the slices may be impregnated with syrup by dipping them in the sugar syrup, draining off the excess syrup, then placing the slices in cans, applying a vacuum to exhaust the air from the apple tissues and to impregnate the slices with the syrup coated on their surfaces. The cans are then sealed while under vacuum and the product frozen in the customary manner. When the frozen product is thawed, there is no loss in texture, but the apples are found to be of a firm, crisp texture, similar, and in some cases superior, to that of the fresh fruit. Further, the product is sweet and has a pleasant, natural flavor and can be used directly as a dessert or can be used in the preparation of pies, cobblers, tarts, etc. For the preparation of pies and other bakery products the apples prepared according to this invention are often superior to the fresh fruit. Thus, for instance, if fresh Delicious apples are used to make pies, they will be somewhat soft in the finished product. On the other hand, if Delicious apples are treated according to the instant invention and then made into pies, they will have a firm texture in the finished product. Another advantage to be mentioned is the amount of drain liquid obtained when the frozen fruit is thawed. When apples are frozen by the usual technique and then thawed, considerable liquid will drain out of the fruit. The formation of this drain liquid is considered objectionable by commercial users of frozen apples and it is therefore an important factor for control. When apples are prepared according to this invention, frozen, and then thawed, the amount of drain liquid is much less than with the conventionally prepared apples. Another point of departure is that in the usual freezing process the apples are first sulphited as by dipping into an aqueous solution of sodium bisulphite. The apples must then be stored for about 8 to 12 hours to allow the sulphite to penetrate and thus to obtain the maximum effect against browning. In the instant process, no storage period is necessary after sulphiting. In the vacuum impregnation step the sulphite penetrates thoroughly into the fruit. Further, lower amounts of $SO_2$ are required. Whereas conventional practice will require at least 2000 to 3000 p. p. m. of $SO_2$, when operating according to this invention, the sulphiting solution can contain but 1000–1500 p. p. m. of $SO_2$ and effective results can be accomplished with a one-minute dip. If, instead of a separate sulphiting dip, the sulphiting agent is incorporated in the syrup, even lower concentrations of $SO_2$ may be used.

An important feature of this invention is that the sugar syrup impregnated apples are packaged and frozen as such and are not covered with sugar syrup or dry sugar. Thus after the vacuum impregnation step, the apples are drained and packaged in such condition then frozen. In the alternative procedure, the apples are dipped in the syrup, drained and sealed in cans under vacuum. Thus in every case when operating in accordance with this invention, the added sugar is within the apple tissues and the exteriors of the slices are at most only covered with a thin film or coating of sugar syrup. These factors have a very important effect in reducing the amount of liquid which exudes from the product on thawing. Thus the frozen products in accordance with this invention when thawed exude only a minor amount of liquid on the order of 10% and much less in some cases. Such result cannot be achieved with prior art techniques. Thus it has been proposed that fruit be vacuum-impregnated with syrup and then packed in sugar syrup or dry sugar. In such techniques there is a large drainage loss on thawing. The point is that in this prior method, the sugar surrounding the fuit extracts considerable moisture from the fruit tissues by osmosis. As a result when the product is thawed, it exudes an amount of liquid over and above that added to cover the fruit since this exuded liquid contains both (1) the syrup used to cover the fruit plus (2) the moisture drawn out of the fruit by osmosis. A comparison of the instant process with that of the prior art is shown herein in Example 5. This example illustrates clearly how the instant process is superior with regard to amount of drainage liquid formed on thawing.

An object of this invention is to provide a process for the vacuum impregnation of apples with sugar solution.

Another object of this invention is to provide a process for preparing frozen apples, wherein the apples are first vacuum-impregnated with sugar solution.

Further objects and advantages will be obvious from the disclosure herein.

As heretofore stated, this invention involves the vacuum impregnation of apples with sugar solution. Many types of apparatus can be utilized for this procedure. One type of apparatus which has been found to give satisfactory results is described as follows:

The impregnator vessel is a large glass jar equipped with a ground, flanged top. A glass lid provided with a valved port fits snugly on said flanged top. By use of stopcock grease, or other suitable lubricant, this joint can be made vacuum tight. In performing the impregnation, the apples are placed in the jar and a heavy, pierced porcelain plate is put on top of them to hold them down. Syrup is then poured into the jar in sufficient quantity to cover the apples. The lid is then placed on the jar and the port on the lid connected with a suitable source of vacuum such as a vacuum pump. Preferably a vacuum gauge is put in the line to be sure that the system is functioning properly. As soon as the atmosphere in the jar becomes rarified, intense frothing occurs as the air in the apple tissues is withdrawn. The vacuum treatment is continued until this bubbling ceases or at least becomes slow. The vacuum is then broken and the apples are permitted to remain in the syrup for a few minutes so that impregnation can be effected. It is obvious that many different types of apparatus can be utilized for this purpose. The vessel may be made of stainless steel, for instance, and may be equipped with sight glasses, inlet ports, drain pipes, etc.

It is not essential to have the apples immersed in the sugar syrup during the vacuum treatment. The apples may be placed in a vessel which is connected to a source of sugar syrup by a valve-controlled pipe. This valve is closed and the vessel is subjected to vacuum. After this treatment has been continued for a sufficient length of time, the valve is opened, whereby sugar syrup is drawn into the vessel and serves to impregnate the apples. In such treatment the syrup is preferably heated to obtain quicker impregnation.

If desired, further impregnation can be obtained as follows: The apples are subjected to vacuum, then contacted with sugar syrup to impregnate the apple tissues. Pressure is then applied to the apples immersed in the sugar syrup, whereby further impregnation of the syrup is effected.

In the alternative modification of the process of this invention, the apples, preferably in the form of slices, are immersed in the sugar syrup or otherwise treated so that they are uniformly coated with the syrup. Any excess syrup is removed by draining and the syrup coated apples are placed in cans or other vessels which may be hermetically sealed. Vacuum is then applied to the cans whereby to remove the gases from the apple tissue and to cause the syrup coating to enter into the tissue into the voids formerly occupied by the gases. The cans are then sealed while under vacuum.

The following examples describe particular steps, conditions, and materials in accordance with this invention. These examples are submitted only by way of illustration and not limitation.

EXAMPLE 1

Delicious apples were mechanically peeled, cored, trimmed, and sliced. A batch of apple slices was placed in a glass impregnator similar to that described above and covered with an aqueous solution containing 60% sucrose, 0.1% ascorbic acid, and 1% citric acid. A vacuum was applied above the surface of the liquid (29 in. Hg gauge pressure) and held until most of the air was exhausted from the apple tissue, i. e., until bubbling had substantially ceased. The vacuum was then broken and the slices allowed to remain in the syrup for one to two minutes. The slices were then drained, packaged, and frozen at $-10°$ F.

After storage for about 1 month under refrigeration, the packages were opened and the contents placed in the draft from an electric fan to expedite thawing. After four hours the product was observed and tasted. It was found to have good color, good flavor, and firm texture. Pies were made from the product using a standard technique. The apples in the finished pie were found to have firm texture, good flavor, and good color.

Control experiments

The following experiments do not describe the procedure according to this invention but are given to show the inferior results obtained according to prior art techniques.

(A) A pie was made using the same technique as for the pie in Example 1. Fresh apples were employed in preparing this pastry and were given a dip in aqueous sodium bisulphite (1,000 p. p. m. $SO_2$) before using to prevent oxidation.

(B) Another pie was made from frozen apples prepared in the usual manner, i. e., fresh apple slices were dipped in aqueous sodium bisulphite (2,000 p. p. m. $SO_2$), drained, stored for 8 hours to obtain maximum penetration of sulphite, then frozen. The frozen slices were then thawed and used to make the pie. The apple fillings of the pies were then observed and tasted. The following results were observed:

| Pie | Texture | Flavor | Color |
|---|---|---|---|
| A | Soft | Good | Good. |
| B | Very soft | Low | Good. |

It is evident from the above that the apples prepared according to the instant process are superior to the fresh fruit with regard to texture and superior to the usual frozen fruit with regard to both texture and flavor.

EXAMPLE 2

A batch of apple slices (Delicious) was given a 1-minute dip in aqueous sodium bisulphite (1,500 p. p. m. $SO_2$), then drained and placed in a solution containing 60% sucrose, and 0.25% citric acid. The vacuum was applied until bubbling substantially ceased and then the vacuum was broken and the slices were allowed to remain in the syrup for 1 or 2 minutes. The slices were then drained, packaged, and frozen $-10°$ F.

After storage for about 1 month under refrigeration, the packages were opened and the contents thawed. The fruit was observed to have good color, good flavor, and firm texture. A pie prepared from the fruit was observed and tasted. The apple filling thereof had good color, good flavor, and firm texture.

EXAMPLE 3

The process set forth in Example 1 was repeated. In this case, however, the syrup containing 50% sucrose and 0.1% ascorbic acid. The product had good color, good flavor, and firm texture. The filling in a pie prepared from the product had good flavor, good color, and better texture than when using fresh fruit.

Drainage tests

A series of experiments were performed in order to determine the amount of liquid formed upon thawing the frozen products prepared according to this invention and to compare the results with the amount of drainage obtained with prior art processed.

(A) Apple slices were vacuum-impregnated in a solution containing 60% sucrose as heretofore described and the product frozen.

(B) Apple slices were vacuum-impregnated in a solution containing 40% sucrose as heretofore described and the product frozen.

(C) Apple slices were given a two-minute dip in aqueous sodium bisulphite (2,000 p. p. m. $SO_2$), stored for 8 hours at room temperature, and then frozen.

(D) Apple slices were vacuum-impregnated with an aqueous solution of sodium bisulphite (500 p. p. m. $SO_2$), then frozen.

In each case the frozen material was weighed and allowed to stand at room temperature for 6 hours, then the material was poured on a screen, drained for 15 minutes, and the material on the screen weighed. By this method the amount of drain liquid was easily determined. The following results were obtained:

| Experiment | Loss in weight due to drainage, percent |
|---|---|
| A | 7.1 |
| B | 8.2 |
| C | 27.8 |
| D | 40.4 |

It is to be noted that in this series of experiments, samples A and B represent the procedure according to this invention. Sample C represents the usual technique, and D illustrates results obtained when sulphiting is achieved by vacuum impregnation.

EXAMPLE 4

A series of frozen products were prepared to compare the processes of this invention and a prior art method. In each case, the raw material was sliced Gravenstein apples.

(a) One sample of the apple slices was processed in accordance with the procedure set forth in Example 1. In this case, however, the syrup contained 60% sucrose and 0.2% ascorbic acid. The products were packaged in cans and frozen at $-10°$ F.

(b) Another sample of the apple slices was processed as follows: The slices were dipped for 5 minutes in sugar syrup containing 60% sucrose and 0.2% ascorbic acid. The slices were then drained and filled into cans. The cans were then subjected to a vacuum of 29 inches of mercury and sealed while under vacuum. The canned product was frozen and stored at $-10°$ F.

(c) Another sample of the slices was sulphited by dipping 2 minutes in a solution containing 2,000 p. p. m. $SO_2$ (added as $NaHSO_3$ and adjusted to pH 3.0 with citric acid). The sulphited slices were drained, packaged in cans and frozen and stored at $-10°$ F.

Drainage tests

The amount of drip or leakage in these products was tested by the following method: The products were defrosted by running tap water for 3½ hours about the sealed cans. The defrosted slices were then placed on an 8-mesh screen and allowed to drain for 5 minutes, provision being made to catch the drainage liquid. The results are set forth in the following table. The amount of liquid which drained out of the products is expressed as the proportion of drainage liquid to total weight of the product on a percentage basis.

| Product | Amount of drainage liquid, percent |
|---|---|
| a | 11.0 |
| b | 9.5 |
| c | 22.0 |

*Pie baking tests*

Pies were prepared from each of the above-described products using a standard technique in each case. The following results were obtained:

In the case of the pies prepared from products a and b, the filling was still in the form of slices having their natural shape and appearance. Further, the filling had a good, natural flavor.

In the case of the pies prepared from product c, the filling was in the form of a mushy sauce lacking in natural flavor.

EXAMPLE 5

A lot of fresh Newtown Pippin apples was peeled, cored, and sliced into twelfths. The slices were placed in a glass vessel and covered with an aqueous solution containing 60% sucrose. A vacuum (29 in. Hg) was applied above the surface of the liquid and held for 3 minutes. The vacuum was then broken and the slices removed from the sugar solution and drained in a single layer on a screen.

A. Two #2 cans were each filled with 200 grams of the drained, syrup-impregnated apple slices. The cans were then sealed without adding anything, thus these cans contained only the drained, syrup-impregnated apple slices.

B. Two #2 cans were each filled with 200 grams of the drained, syrup-impregnated apple slices. To each can was then added 200 ml. of the syrup used in the vacuum impregnation procedure, this amount of syrup being sufficient to cover the apple slices.

All four cans were then frozen in a refrigerator at −10° F. and held at this temperature for 3 days. The cans were then removed from the refrigerator and allowed to thaw for 21 hours in a room maintained at 35°–40° F. The cans were then opened and the contents of each was dumped onto a screen, provision being made to collect and measure the liquid exuding from the thawed slices.

It was observed that products A—prepared by freezing the drained, vacuum-impregnated slices—did not exude any liquid at all. However products B—prepared by covering the vacuum-impregnated slices with syrup—exuded 221 ml. of liquid in one case and 222 ml. of liquid in the duplicate experiment. Since only 200 ml. of syrup had been added initially, the experimental data indicate that 21 to 22 ml. of liquid was extracted from the slices by the osmotic effect of the sugar syrup surrounding the slices.

The experimental results are set forth below in tabular form:

| Experiment No. | Conditions employed | Amount of liquid extracted from apples, ml. |
|---|---|---|
| A1 | Drained | 0 |
| A2 | do | 0 |
| B1 | Packed in syrup | 21 |
| B2 | do | 22 |

As previously set forth, this invention involves the vacuum impregnation of apples with sugar solution. This solution or syrup should contain at least about 40% sugar, preferably from about 40% to about 60%. Although sucrose is preferred, other sugars commonly used for sweetening foods may be used. Thus one may employ dextrose, fructose, corn sugar, corn syrup, glucose, molasses, invert sugar, etc. Regardless of what type of sugar is used, it should be present in approximately the range set forth above. Various agents may be added to the syrup to accomplish particular purposes. Thus small amounts of ascorbic acid, from about 0.1% to about 0.5%, preferably from about 0.2 to about 0.3%, may be added to prevent or at least retard browning of the apples. Instead of ascorbic acid a sulphiting agent may be used for this purpose, thus one may add sulphur dioxide, sulphurous acid, or any non-toxic, soluble inorganic sulphite or bisulphite such as sodium bisulphite, sodium sulphite, potassium bisulphite, potassium sulphite, sulphites of ammonia, etc. In any case the concentration of the sulphiting agent, expressed as $SO_2$, should be from about 100 p. p. m. to about 500 p. p. m., preferably from about 200 p. p. m to about 300 p. p. m. Both ascorbic acid and sulphiting agent may be added to the syrup in which case smaller amounts of each will be needed. A small percentage of salt (about .2% to 1%) is usually advantageous as increasing the effect of the ascorbic acid or sulphiting agent or their mixtures. In the case of Delicious apples it is advisable to add some citric acid (0.5% to 1%) to the syrup to give the apples a slight tartness which is lacking in this particular variety. If desired harmless food colors may be added to the syrup to dye the apples any desired shade. Natural or synthetic flavors may be added to the syrup to give the apples any desired flavor. In further extension of this principle, the apples may be vacuum impregnated with fruit compositions rich in sugar and natural flavoring constituents, as for example, concentrated fruit juices. In such case the fruit juice should be concentrated to such an extent that the sugar concentration thereof is at least 40%, preferably from about 40% to about 60%. A particularly desirable material in this category is concentrated apple juice which has been prepared without significantly altering the natural flavor of the juice. One method for preparing such a product is freeze concentration which involves subjecting the fruit juice to temperatures below freezing and removing the ice from the treated juice. Another method for preparing a suitable concentrated apple juice involves subjecting the apple juice to a first evaporation step whereby the volatile essence is stripped from the juice. The residual juice and the essence are then separately concentrated, preferably under vacuum, and the concentrated residual juice and the concentrated essence are then re-combined to give a highly flavored concentrate. The procedure of Walker and Talburt described in their patent application Serial No. 158,051, filed April 25, 1950, now abandoned (abstract published in Patent Office Official Gazette, vol. 654, page 324, January 1, 1952), may also be employed to produce a suitable apple juice concentrate. Their procedure involves stripping the volatile essence from the juice, separately concentrating the residual juice and the essence and then combining the concentrated essence, concentrated residual juice and fresh apple juice. An example of preparing a concentrate in this manner is set forth below:

44.6 gallons of fresh de-pectinized apple juice (13.3° Brix) was subjected to evaporation at atmospheric pressure to strip off about 25% of the juice. During this evaporation about 15 gallons of water was added to the juice by reason of the steam used to heat the juice by direct contact. The stripped juice (40 gallons, 15° Brix) was then subjected to evaporation under a pressure of about 1 in. Hg to yield 7.475 gallons of juice concentrate (67.7° Brix). The volatile matter obtained in the stripping operation was distilled to obtain 0.495 gallon of concentrated essence (95-fold concentrate). The juice concentratee, concentrated essence, and 5.1 gallons of fresh juice were mixed together to produce 13 gallons of an approximately 4-fold concentrate (45.7° Brix).

If ascorbic acid or a sulphiting agent is not added to the syrup, then it is desirable to give the apples a sulphiting dip prior to the vacuum impregnation. For this purpose the apples are dipped into an aqueous solution of sulphurous acid or any non-toxic, soluble inorganic sulphite or bisulphite such as sodium bisulphite, sodium sulphite, potassium bisulphite, potassium sulphite, sulphites of ammonia, etc. The concentration of sulphiting agent, expressed as $SO_2$, should be about 1000 to about 2000 p. p. m. and the duration of the dip should be about one minute. In order to obtain thorough impregnation of the apple tissue with the syrup it is necessary to peel the apples beforehand. Preferably the apples are also cored and cut into convenient pieces, such as by slicing into sections ranging from halves to twelfths.

Although the process of this invention has been emphasized as a treatment prior to freezing, it is obvious that freezing is not essential. The impregnated apples can be used directly as a dessert or for the making of pie or other food products.

The abbreviation "p. p. m." used herein means parts per million.

Having thus described my invention, I claim:

1. A method for preserving apples which comprises subjecting peeled, cored, and sliced apples to a 1-minute dip in a sulphiting bath containing about 1000 to about 2000 p. p. m. $SO_2$, removing the apples from the sulphiting bath, there being no storage period after sulphiting, subjecting them to a vacuum, releasing the vacuum while the apples are immersed in a sugar solution containing about 40% to about 60% sucrose, removing the apples from the sugar solution, draining the sugar solution from the apples and freezing the drained sugar impregnated apples.

2. A method for preserving apples which comprises subjecting peeled apples to a dip in a sulphiting bath, removing the apples from the sulphiting bath, there being no storage period after sulphiting, subjecting them to a vacuum, releasing the vacuum while the apples are in contact with a sugar solution, draining the apples to remove excess sugar solution and then freezing the drained, sugar-impregnated apples.

3. A method for preserving apples which comprises subjecting apple slices to a dip in a sulphiting bath containing about 1000 to about 2000 p. p. m. $SO_2$, removing the apples from the sulphiting bath, there being no storage period after sulphiting, subjecting them to a vacuum, releasing the vacuum while the apples are immersed in a sugar solution containing about 40% to about 60% sucrose, removing the apples from the sugar solution, draining the sugar solution from the apples and then freezing the drained, sugar-impregnated apples.

References Cited in the file of this patent

UNITED STATES PATENTS

| Number | Name | Date |
| --- | --- | --- |
| 1,631,017 | Crawford | May 31 1927 |
| 2,209,889 | Lachman | July 30, 1940 |

OTHER REFERENCES

"The Freezing Preservation of Foods," 1943, by Tressler et al., published by The Avi Publishing Co., New York, pages 285 to 287, inclusive.

U. S. Dept. of Agriculture Publication entitled "Commercial Preparation and Freezing of Sliced Apples," August 1945.

Bauernfeind et al., article entitled "Methods of Freezing Sliced Apples with 1-Ascorbic Acid," reprint from The Fruit Products Journal and American Food Manufacture, Issue Vol. 26, Sept. 1946.